United States Patent [19]

Abernethy

[11] E Patent Number: Re. 33,068

[45] Reissued Date of Patent: Sep. 26, 1989

[54] SEA ANCHOR OR CHANGEABLE DRAG

[76] Inventor: William J. Abernethy, R.M.B. 128 Delegate, New South Wales, Australia

[21] Appl. No.: 141,193

[22] Filed: Jan. 6, 1988

Related U.S. Patent Documents

Reissue of:

[64] Patent No.: 4,562,788
Issued: Jan. 7, 1986
Appl. No.: 634,227
Filed: Nov. 23, 1983

[30] Foreign Application Priority Data

Nov. 23, 1983 [AU] Australia ..... PF6934

[51] Int. Cl.[4] ..... B63B 21/48
[52] U.S. Cl. ..... 114/311; 441/13
[58] Field of Search ..... 114/293–311; 441/13, 11; D12/215; 52/155; 244/1 TD

[56] References Cited

U.S. PATENT DOCUMENTS

| | | | |
|---|---|---|---|
| 2,491,564 | 12/1949 | Iversen | 114/311 |
| 2,940,411 | 6/1960 | Bartels et al. | 114/299 |
| 3,755,836 | 9/1973 | Milazzo | 114/311 |
| 4,096,818 | 6/1978 | Wameling | 114/113 |

*Primary Examiner*—Joseph F. Peters, Jr.
*Assistant Examiner*—Jesûs D. Sotelo
*Attorney, Agent, or Firm*—Foley & Lardner, Schwartz, Jeffery, Schwaab, Mack, Blumenthal & Evans

[57] ABSTRACT

A device of the nature of a sea-anchor has a body tapered to the nose where it is attachable to a cable from a boat and formed with ports normally closed by spring-loaded closures but opened, by predetermined cable tension, to increase resistance to passage through water. Tail fins behind the body, and water passages through the body restrict rotation of the device. A chamber in the body when air-filled converts the device to a distress buoy, the tail fins uppermost to serve as a radar reflector, aerial for a distress transmitter in the body and carrier for a light.

13 Claims, 2 Drawing Sheets

SEA ANCHOR OR CHANGEABLE DRAG

Matter enclosed in heavy brackets [ ] appears in the original patent but forms no part of this reissue specification; matter printed in italics indicates the additions made by reissue.

BACKGROUND OF THE INVENTION (1) Field of the Invention

This invention relates to an improved sea-anchor or like device.

(2) Brief Description of the Prior Art

Sea-anchors or drag-anchors have long been known and made in a wide variety of forms, such a device being attached to a hawser paid out from a ship or boat to check the leeway of a drifting vessel or to prevent it from broaching-to.

SUMMARY OF THE PRESENT INVENTION

The general object of the present invention is to provide a device of this general character which may be used for the foregoing purposes and also to apply more or less constant restraint to a vessel running before a sea, and to serve as emergency steering means. A further object achievable in preferred embodiments of the invention is to provide such a device which may operate as an effective distress buoy with signaling means to assist and guide searchers.

With the foregoing and other objects in view the invention resides broadly in a sea-anchor or like device including a body; attachment means for attaching a hawser to the body; movable members on the body, and actuating means so connecting the attachment means to the movable members that when the application of predetermined tension through a hawser to the attachment means, the movable members are moved to increase the resistance of the body to passage through water. Preferably the body is hollow, with a number of ports therein, the movable members being closures therefor, the attachment means being movable longitudinally relative to the body, spring-loading means urging the closure to closed position, the actuating means acting to move the closures to open position against the action of the spring-loading means. As a restraint against spinning of the body in the water, preferably the body has water flow through passages from its front to its rear, and behind its rear an assembly of fins. Other features of the invention will become apparent from the following description.

BRIEF DESCRIPTION OF THE DRAWINGS

A preferred embodiment of the invention is shown in the accompanying drawings, wherein.

DETAILED DESCRIPTION OF THE PREFERRED EMBODIMENT

Figure 3:
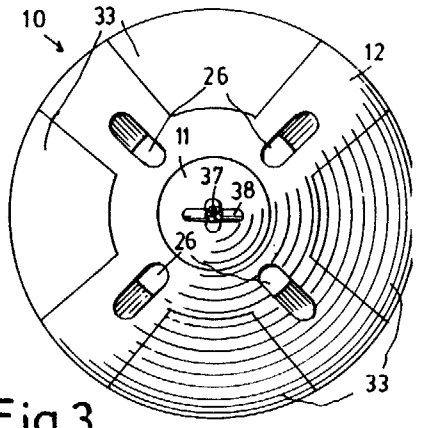
FIG. 3 is a front end view of the device.
Figure 4:
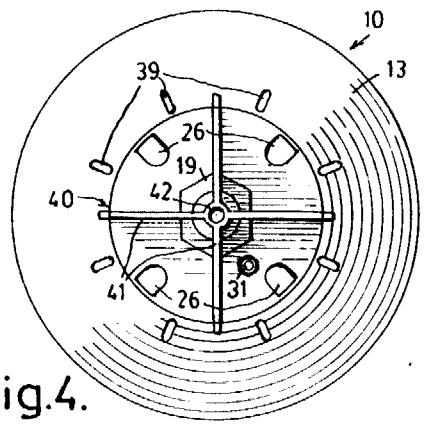
FIG. 4 is a rear end view of the device.
Figure 1:
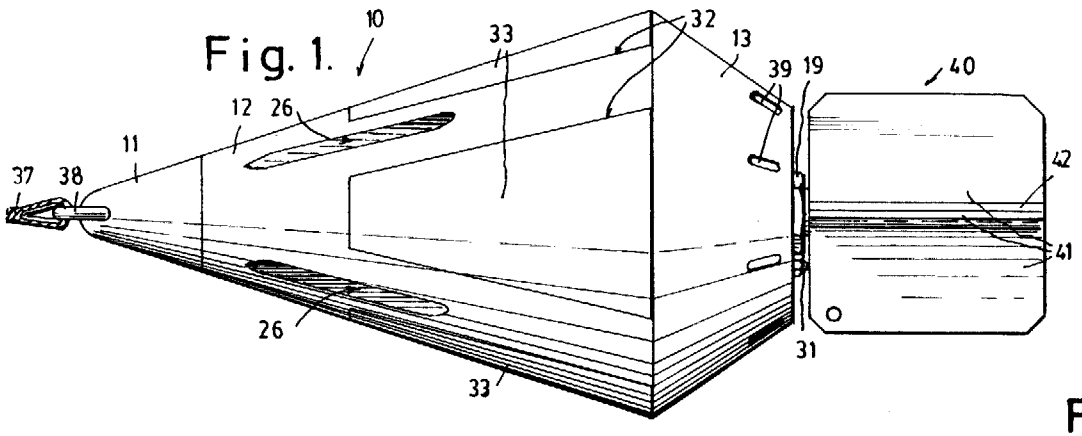
FIG. 1 is a side elevational view of a device according to the invention with its port closure plates fully closed.
Figure 2:
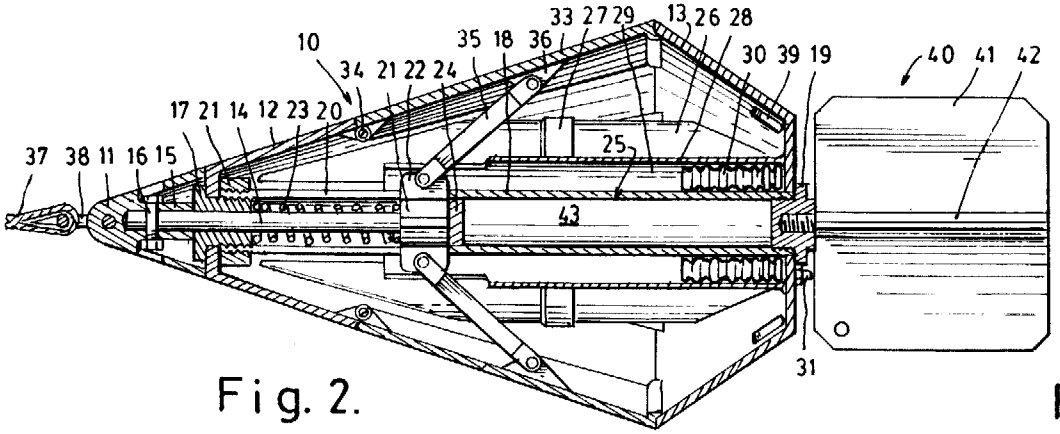
FIG. 2 is a longitudinal sectional view of the device shown in FIG. 1.

The device shown in the drawings includes a body 10 and a nose cone 11. The body 10 comprises a front part 12 and a rear part 13, the nose cone 11 when in normal retracted position as shown in FIGS. 1 and 2 forming, with the front part 12 of the body, a conical assembly increasing in diameter from front to rear, the rear part 13 of the body being of frusto-conical shape diminishing in diameter from front to rear. The nose cone 11 is preferably of stainless steel, but the front and rear parts 12 and 13 of the body may be of a tough moulded plastics material secured coaxially together in any suitable manner.

The nose cone 11 is fixed on the front end of a shaft 14 which is closely engaged in the axial bore of an internal boss 15 in the nose cone and secured by a dimetral locking bolt 16. The nose cone shaft 14 enters the body 10 coaxially by way of a fore-end bush 17 passing through a central hole in the front of the body front part 12 and threadedly engaged in the front part of an axial tube 18 through the body 10, its rear end being engaged in a central hole in the back of the rear part 13 of the body and secured by a locking plug 19 screwed into the rear end of the axial tube and bearing on the back of the rear part 13 of the body.

The axial tube 18 is formed, from its front, with four equally spaced longitudinal radial slots 20. A nut 21 screwed onto the front part of the axial tube 18 bears against the front wall of the body front part 12.

The rear end of the nose cone shaft 14 is fixed coaxially in a plunger 21a having four radiating lugs 22 which are slidable in the slots 20. A helical compression spring 23 about the nose cone shaft 14 between the fore-end bush 17 and the plunger 21 urges the plunger to its rearmost position, as shown in FIG. 2, the nose cone 11 then being against the front of the body front part 12.

A middle plug 24 in the axial tube 18 defines the front end of a sealed transmitter compartment 25 in the rear part of the tube 18.

Four longitudinal and parallel tubular flow-through water passages 26 extend through the body 10, from elongated inlets at the coned front part 12 of the body to outlets in the rear wall of the body rear part 13, the radial length of the outlets being diminished because of the coned formation of this rear part. For ease of manufacture, each of the tubular flow-through water passages 26 is in two sections, formed integrally with the two parts 12 and 13 of the body and with spigot and socket interfitment at 27.

Formed integrally with the rear part 13 of the body 10 is a coaxial cylindrical housing 28, spaced about the axial tube 14 so that an annular chamber 29 is formed between the two. Within this chamber there is packed an annular air bladder 30, normally collapsed concertina-fashion, but capable of being inflated with air introduced under pressure by way of a nipple 31 at the back of the rear body part 13.

Four equally spaced ports 32 of similar configuration are formed through the front part 12 of the body, each increasing in breadth from its front to its rear terminating at the junction of the body's front and rear parts 12 and 13.

Figure 5:
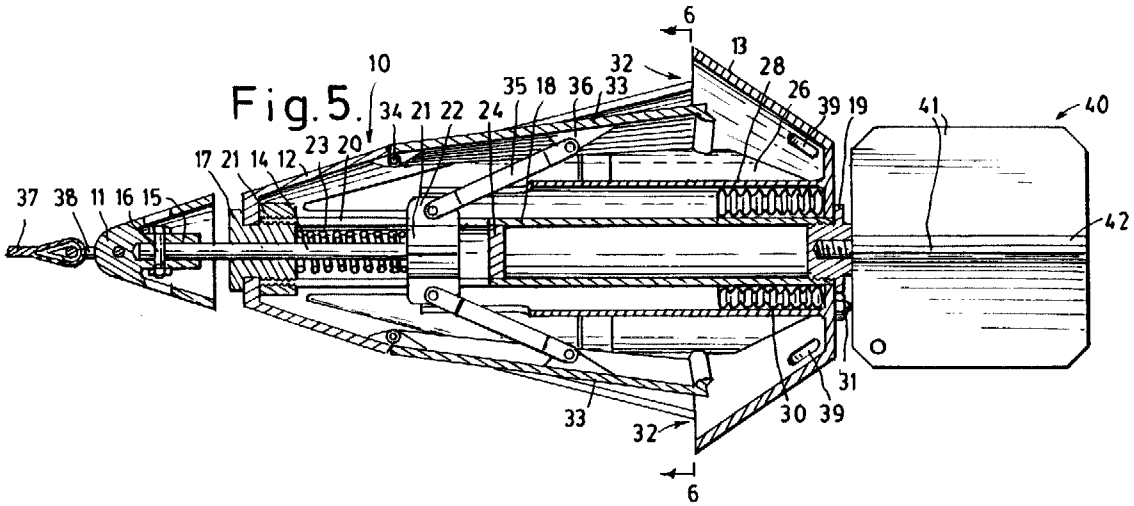
FIG. 5 is a sectional view similar to FIG. 2, but showing the port closure plates of the device fully opened.
Figure 6:
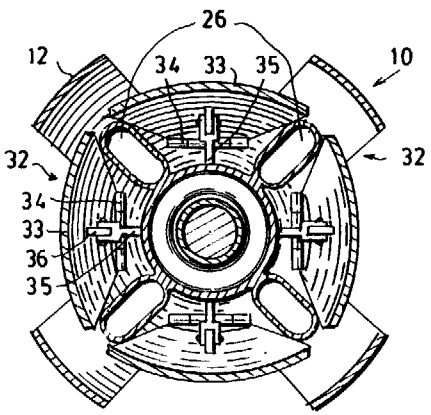
FIG. 6 is a cross-sectional view of the device taken along line 6—6 in FIG. 5.

Each of the ports 32 is normally closed by a closure plate 33, its front end hinged at 34 to the body front part 12. Within the body 10, drag links 35 are connected between lugs 36 on the insides of the closure plates 33 and the lugs 22 on the plunger 21 so that, when the plunger 21 is in its fully retracted position, the closure plates are held firmly in their closed positions, and when the plunger 21 is advanced against the action of the compression spring 23, the drag links 35 move the closure plates hingedly towards or to their fully opened positions, as shown in FIGS. 5 and 6.

A hawser 37 is made fast to a ring 38 through a diametral hole in the front end of the nose cone 11. A number of water outlet openings 39 are formed through the frusto-conical wall of the rear part 13 of the body 10.

A tail fin unit 40 has four fins or vanes 41 radiating from a central hub 42 which is fixed coaxially to the rear plug 19. In certain circumstances the tail fin unit may serve as an aerial for a radio distress signal transmitter device 43 sealed within the compartment 25 in the axial tube 18.

When the device is trailed from a vessel at the end of the hawser 37, it will sink below the surface of the water and, because of the resistance it offers, it will effect restraint on the vessel. The passage of water through the flow-through water passages 26 and through their restricted rear outlets past the tail fin unit 40 will ensure good stability of the device and prevent or greatly reduce any tendency of the device to rotate about its axis.

If the vessel should be running before a sea, the tension on the hawser will fluctuate, increasing considerably with each wave reaching the vessel, and with each such increase in tension the nose cone 11 and its shaft 14 will be extended from the body 10 against the action of the compression spring 23 so that the drag links 35 will cause the closure plates 33 to be moved to partly or fully opened positions. The turbulence of the water resulting from the opening of the ports 32 and the pressure of its influx to the rear part 13 of the device materially increases the drag applied to the hawser beyond the resistance offered when the ports are closed and the water through which the device is drawn flows smoothly over it. With a subsequent reduction on the tension applied through the hawser, the ports 32 will be automatically closed, or partly so, by the closure plates 33, reducing the drag of the device.

The device will be found to be valuable not only for a vessel under power which is running before a sea but also as a sea anchor for a vessel without power; and it may be used also for emergency steering in the event of loss of rudder, the hawser being paid out from either port or starboard to create a hinge point for turning the vessel. With increased propulsion, greater resistance is offered by the device and the vessel's turning response will be faster than would be the case with a conventional sea anchor or drag anchor.

When the device is not being used in the manner described but is on board a vessel which is in distress, the tail fin unit 40 may be detached and lifted to a mast head by a halyard for use as a radar reflector to give a clear reading in response to a radar search.

Figure 7:
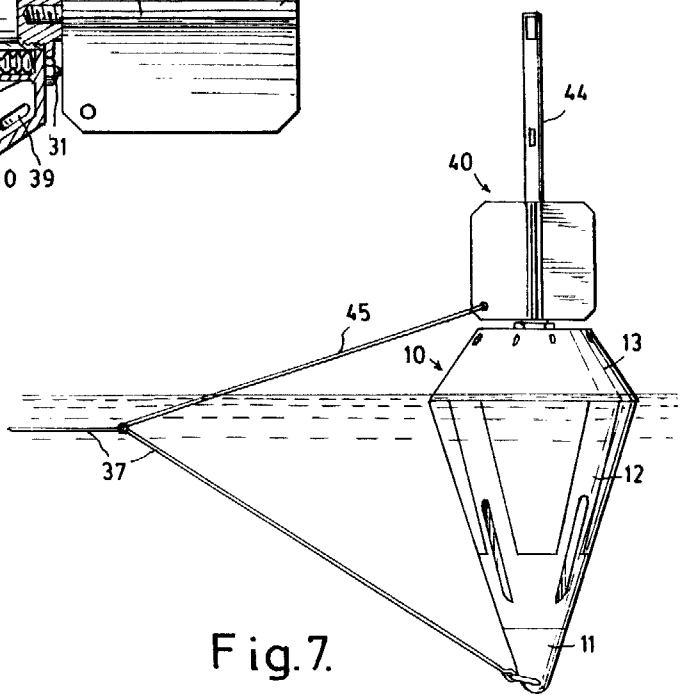
FIG. 7 is a side elevational view of the device to reduced scale, in a vertical rather than horizontal position, to serve as a distress signalling device as well as a sea-anchor.

If the vessel appears about to be lost and the crew are about to take to a life boat or raft, the bladder 30 may be inflated so that, as shown in FIG. 7, the device will float with the nose cone 11 down, a strobe light 44 may be screwed into the tail fin unit 40 and put into operation, and the radio distress signal transmitter device 43 may be actuated. A cable 45 connected between the tail fin unit 40, for which purpose a hole is provided in one of the vanes 41, and the hawser 37 will enable the device, floating upright, to serve not only as a distress buoy but also as a sea-anchor trailed from the life boat or raft by the hawser 37, the distress signal transmitter, strobe light and radar reflector assisting searchers to locate and rescue the crew.

I claim:

1. A sea-anchor or like device including:

a hollow body, attachment means, movable longitudinally in relation to the body for attaching a hawser to the body, a plurality of ports formed in the body, closures for the ports, spring-loading means urging the closures to closed position, and actuating means so connecting the attachment means to the closures that, upon the application of predetermined tension through a hawser to the attachment means, the closures are moved to open position against the action of the spring-loading means to increase the resistance of the body to passage through water.

2. A sea-anchor or like device according to claim 1 wherein:

the attachment means is on the fore-end of a shaft slidable in the body, and the actuating means includes links connecting the shaft to the closures.

3. A sea-anchor or like device according to claim 1 wherein:

the body has a substantially conical front part tapering to the front and a substantially frustoconical rear part tapering towards the rear, the ports are formed in substantially equally spaced arrangement in the body front part, each tapering towards its front, and the closures are hinged at their fronts to the body front part for hinged movement into the body.

4. A sea-anchor or like device according to claim 1 wherein:

an assembly of fins is mounted behind the rear of the body, and a plurality of water flow-through passages are formed through the body from its front part to its rear.

5. A sea-anchor or like device according to claim 4 wherein:

a chamber within the rear part of the body may, by the introduction of air, be made a buoyancy chamber for bringing the body, in water, to an upright position, its assembly of fins uppermost, and the assembly of fins serves as an aerial for a radio distress signal transmitter within the body.

6. A sea-anchor or like device according to claim 5 wherein:

means are provided for mounting a signal light on the assembly of fins.

*7. A sea anchor or like device comprising:*

*a hollow body having front and rear parts, each of which has a forward and rear end,*

*attachment means for attaching a line to the forward end of said front part for towing the body in a forward direction,*

*said front part of said body having an outer surface which converges toward its forward end, and said rear part of said body having an outer surface which converges towards its rear end,*

*a plurality of ports formed in said body for admission of water to the interior of the body, and*

*at least one outlet in said body for permitting escape of water from the interior of the body.*

*8. A sea anchor or like device as claimed in claim 7 wherein said outer surface of said front part is generally conical, and said outer surface of said rear part is generally frustoconical.*

*9. A sea anchor or like device as claimed in claim 8 wherein said ports are located adjacent to said front end of said rear part of the body.*

*10. A sea anchor or like device as claimed in claim 9 wherein said ports are equidistantly spaced about the periphery of the body.*

*11. A sea anchor or like device as claimed in claim 7, further including fins to resist rotation of the body.*

*12. A sea anchor or like device as claimed in claim 7 wherein said at least one outlet is located in said rear part of the body.*

*13. A sea anchor or like device comprising:*

*a hollow body having front and rear parts, said each of which includes a forward end and a rear end,*

*attachment means for attaching a line to the forward end of said front part for towing the body in a forward direction,*

*said front part tapering radially outwardly from its front end, said rear part tapering radially inwardly from its front end in a direction opposite to said forward direction,*

*a plurality of ports for admission of water to the interior of the body, and*

*at least one outlet in the body for permitting escape of water from the interior of the body.*

* * * * *